N. J. Wemmer,
Sharpening Reciprocating Saws.
N°2,011.                    Patented Mar. 18, 1841.
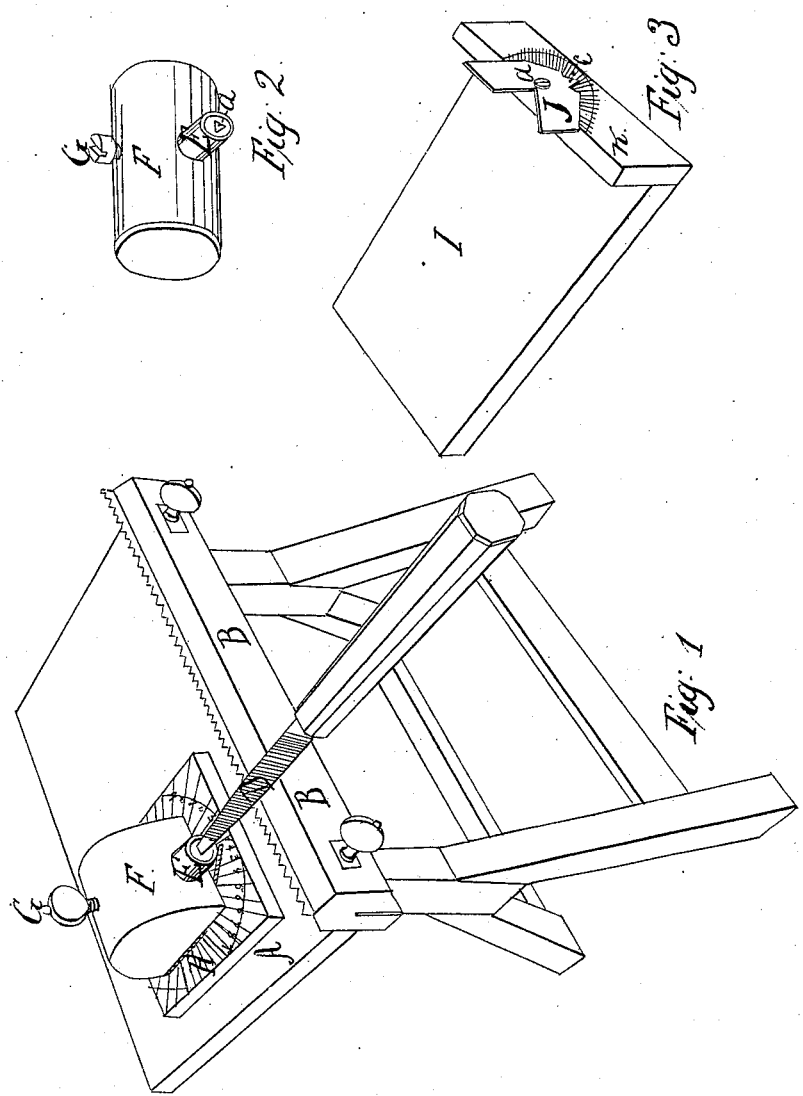

UNITED STATES PATENT OFFICE.

NILSON J. WEMMER, OF PHILADELPHIA, PENNSYLVANIA.

APPARATUS FOR FILING SAWS.

Specification of Letters Patent No. 2,011, dated March 18, 1841.

*To all whom it may concern:*

Be it known that I, NILSON J. WEMMER, of the city of Philadelphia, in the State of Pennsylvania, have invented a new and useful apparatus for the Purpose of Holding and Guiding Files in the Sharpening of Saws; and I do hereby declare that the following is a full and exact description thereof.

In the accompanying drawings, Figure 1 shows the apparatus as in use for sharpening a saw. A, A, is a table, or bench, having on its front a clamp B, B, for holding a saw C, C. The end of the file D, is inserted into a piece of wood $a$, in which a triangular hole is pierced to receive it. This piece of wood is inclosed in a tube of metal E, which passes through a block of wood F, there being a tightening screw G, to confine the tube E, in any position in which it may be placed. The block of wood F, is attached to a flat piece of wood, or metal H, by a center pin on which it may be turned, there being a screw nut underneath to hold it in place. On the upper side of H, there are graduations which may be numbered, as shown on the drawing, and on the bottom of F, an index, or point $b$, by which to ascertain the angle at which the block F, is set. When this instrument is used, one hand is placed upon the block F, while the handle of the file is held in the other, and the eye will enable the person to move the block F, back and forth with the front edge of H, parallel, or nearly so, with the clamp, or front of the table. In this way every other tooth is to be filed, and when this has been done the inclination of the block F, on its basis H, is to be reversed, and the intermediate teeth filed, the position of the tube E, not being changed. It will be readily perceived that by this means the vertical and horizontal angles of the teeth will be given with all necessary uniformity.

I have essayed the use of a guide to direct the piece H, in the exact angle required. This guide consisted of a strip of wood, or of metal, placed upon the table A, A, and which could be so shifted as to change its angles of inclination; this strip entered a groove on the under side of H, and guided it back and forth. The clamp B, was then made to slide endwise, and had to be shifted for every tooth to be filed; or the guide strip had to be made to shift on the top of the table. The complexity of the apparatus was, in either case, such as to render it very objectionable, and in practice it was not found to be productive of any corresponding utility, or, indeed, to be desirable. I sometimes use this apparatus in a form still more simple, not employing the piece H, under the block F, but using the tube E, only, with its adjustment, as shown in Fig. 2. In this figure the block F, is represented as cylindrical, although it may be in other forms. The tube E, with the piece of wood $a$, to receive the point of the file, and the tightening screw G, remaining as before. The vertical angle of the teeth will be determined by this instrument just as in that first described, the eyes governing it in the other direction, as the block is moved back and forth upon the table.

Fig. 3 is a gage by which to set the file, so as to determine the vertical angle of the teeth. I, is a platform upon which to place the block F, and J, an index plate standing at right angles with the plane of I; its index point is shown at $c$, and a tightening screw at $d$; by graduations on the end piece K, it is evident that the file can readily be set at any required angle. The terms horizontal and vertical angles, used by me, have reference to the saw as it stands in the clamp, Fig. 1.

What I claim as my invention in the within described apparatus, is—

The use of the block F, in combination with the tube E, passing through it, which tube receives the point of the file, as set forth. I also claim the combining with such a block, and its appurtenances, the graduated piece H, in the manner and for the purpose set forth.

NILSON JOHN WEMMER.

Witnesses:
   THOS. P. JONES,
   D. K. MORSELL.